(12) United States Patent
Kobayashi et al.

(10) Patent No.: US 10,679,479 B2
(45) Date of Patent: Jun. 9, 2020

(54) SERVER, CONTROL METHOD, AND NON-TRANSITORY COMPUTER READABLE MEDIUM STORING CONTROL PROGRAM

(71) Applicant: Toyota Jidosha Kabushiki Kaisha, Toyota-shi, Aichi-ken (JP)

(72) Inventors: Hideki Kobayashi, Miyoshi (JP); Akihiro Muguruma, Nagoya (JP); Yukiya Sugiyama, Toyota (JP); Shota Higashihara, Chiryu (JP); Riho Matsuo, Nagoya (JP); Naoki Yamamuro, Nagoya (JP)

(73) Assignee: Toyota Jidosha Kabushiki Kaisha, Toyota-shi Aichi-ken (JP)

( * ) Notice: Subject to any disclaimer, the term of this patent is extended or adjusted under 35 U.S.C. 154(b) by 0 days.

(21) Appl. No.: 16/229,858

(22) Filed: Dec. 21, 2018

(65) Prior Publication Data

US 2019/0213858 A1    Jul. 11, 2019

(30) Foreign Application Priority Data

Jan. 11, 2018    (JP) ................................ 2018-002921

(51) Int. Cl.
| | |
|---|---|
| *G08B 15/00* | (2006.01) |
| *G01C 21/20* | (2006.01) |
| *G01C 21/34* | (2006.01) |
| *H04W 4/029* | (2018.01) |
| *H04W 4/02* | (2018.01) |
| *H04W 4/024* | (2018.01) |

(52) U.S. Cl.
CPC ......... *G08B 15/002* (2013.01); *G01C 21/206* (2013.01); *G01C 21/3407* (2013.01); *H04W 4/023* (2013.01); *H04W 4/029* (2018.02); *H04W 4/024* (2018.02)

(58) Field of Classification Search
None
See application file for complete search history.

(56) References Cited

U.S. PATENT DOCUMENTS

2005/0073404 A1*  4/2005  Hisano ................... G08B 15/02
                                                       340/506
2006/0187117 A1*  8/2006  Lee ....................... H01Q 1/1257
                                                        342/359
2009/0067639 A1*  3/2009  Sugiura .................. H04M 1/03
                                                         381/73.1

(Continued)

FOREIGN PATENT DOCUMENTS

JP                201618259 A       2/2016

*Primary Examiner* — Chico A Foxx
(74) *Attorney, Agent, or Firm* — Dinsmore & Shohl LLP (57) ABSTRACT

A server for controlling an output of a sound from a sound output device provided in a room of a destination of a moving user, the server including: an information acquiring section configured to acquire position information indicating a position of the user, the destination, and route information indicating a route of the user to the destination; and a control section configured to, in a case in which the user reaches a position within a predetermined range from the destination, control the sound output device to start the output of a sound that simulates a situation in which a person is present in the room based on the position of the user indicated by the position information and the route of the user indicated by the route information.

12 Claims, 7 Drawing Sheets

(56) References Cited

U.S. PATENT DOCUMENTS

| | | | | |
|---|---|---|---|---|
| 2010/0198443 | A1* | 8/2010 | Yabushita | G05D 1/0246 701/25 |
| 2013/0236040 | A1* | 9/2013 | Crawford | H04S 7/304 381/310 |
| 2014/0111336 | A1* | 4/2014 | Lee | G08B 13/1672 340/540 |
| 2014/0244710 | A1* | 8/2014 | Sharma | H04L 67/12 709/201 |
| 2014/0334669 | A1* | 11/2014 | Acharya | G06F 3/017 382/103 |
| 2015/0338116 | A1* | 11/2015 | Furuta | H04L 12/2818 700/276 |
| 2016/0259027 | A1* | 9/2016 | Said | H04W 4/33 |
| 2016/0381475 | A1* | 12/2016 | Starobin | H04R 27/00 381/81 |
| 2017/0076582 | A1* | 3/2017 | Lewandowski | G08B 25/001 |
| 2017/0126510 | A1* | 5/2017 | Jones-McFadden | H04L 41/22 |
| 2018/0035084 | A1* | 2/2018 | Swiss | H04N 7/183 |
| 2018/0075712 | A1* | 3/2018 | Field | G10L 15/08 |
| 2018/0234261 | A1* | 8/2018 | Choi | H04W 4/70 |
| 2018/0293863 | A1* | 10/2018 | Tavares | H04M 11/025 |
| 2019/0033446 | A1* | 1/2019 | Bultan | G01S 5/22 |
| 2019/0037298 | A1* | 1/2019 | Reily | H04R 1/1041 |

\* cited by examiner

SERVER, CONTROL METHOD, AND NON-TRANSITORY COMPUTER READABLE MEDIUM STORING CONTROL PROGRAM

CROSS-REFERENCE TO RELATED APPLICATION

This application claims priority under 35 USC 119 from Japanese Patent Application No. 2018-002921, filed on Jan. 11, 2018, the disclosure of which is incorporated by reference herein.

BACKGROUND

Technical Field

The present disclosure relates to a server, a control method, and a non-transitory computer readable medium storing a control program.

Related Art

Japanese Patent Application Laid-Open (JP-A) No. 2016-18259, discloses a crime prevention system that output a warning message to an intruder who may be in a room of a user's house before a user comes home. In the technique disclosed in JP-A No. 2016-18259, it is determined whether an intruder is present or absent in a room on the basis of radio wave intensity between an indoor master unit and an entrance slave unit performing wireless communication with the indoor master unit. In a case in which the intruder is present in the room or in a case in which it is not determinable whether the intruder is present or absent in the room, a warning message for urging the intruder to leave the room is output to the room However, in the technique described in JP-A No. 2016-18259, only the warning message is output to the intruder who has already intruded into the room, and it is impossible to originally inhibit the intruder from intruding into the room. For this reason, in the technique described in JP-A No. 2016-18259, for example, when the user comes home, it is not possible to inhibit a suspicious person from intruding into the room together with the user.

SUMMARY

The disclosure provides a server, a control method, and a non-transitory computer readable medium storing a control program that may inhibit a suspicious person from intruding into a room, which is a destination of a user.

A first aspect of the present disclosure is a server for controlling an output of a sound from a sound output device provided in a room of a destination of a moving user, the server including: an information acquiring section configured to acquire position information indicating a position of the user, the destination, and route information indicating a route of the user to the destination; and a control section configured to, in a case in which the user reaches a position within a predetermined range from the destination, control the sound output device to start the output of a sound that simulates a situation in which a person is present in the room based on the position of the user indicated by the position information and the route of the user indicated by the route information.

According to the server of the first aspect, in the case in which the user reaches the position within the predetermined range from the destination, the sound output device starts output of the sound for simulating a situation in which the person is present in the room. Accordingly, the first aspect may simulate the situation in which the person is present in the room before the user arrives at the destination and from a time at which the user reaches near the destination. Therefore, the first aspect of the present disclosure may inhibit a suspicious person from intruding into the room of the destination of the user.

The "a sound that simulates a situation in which a person is present in the room" is a predetermined sound that presents a sound (voice) generated when the person is present in the room, even though the person is not present in the room. Specifically, "a sound that simulates a situation in which a person is present in the room" includes a voice of a person, a sound when a person moves, and the like.

According to a second aspect of the present disclosure, in the first aspect, the predetermined range may be a range predetermined based on a distance from the destination.

According to the server of the second aspect, when the user reaches the predetermined range from the destination, the simulation is started. Therefore, for example, in a case in which a distance to the destination becomes small, the simulation of the situation in which the person is present in the room is started. Thus, the second aspect of the present disclosure may further inhibit the suspicious person from intruding into the room, and may inhibit the user from encountering the suspicious person intruding into the room.

According to a third aspect of the present disclosure, in the first aspect, the predetermined range may be a range predetermined based on a required time for the user to arrive at the destination.

According to the server of the third aspect, when the user reaches the range predetermined based on the required time required for the user to arrive at the destination, the simulation is started. Therefore, for example, in a case in which the required time becomes short, such as a few minutes before the user arrives at the destination, the simulation of the situation in which the person is present in the room is started. Thus, the third aspect of the present disclosure may further inhibit the suspicious person from intruding into the room, and may inhibit the user from encountering the suspicious person intruding into the room.

According to a fourth aspect of the present disclosure, in the third aspect, the control section may effect control to start the simulation at a time that is the required time earlier than an estimated arrival time at which the user is estimated to arrive at the destination.

According to the server of the fourth aspect, since the simulation is started at the time that is the required time earlier than the estimated arrival time, the simulation of the situation in which the person is present in the room is started at a more appropriate time. Thus, the fourth aspect of the present disclosure may further inhibit the suspicious person from intruding into the room, and may inhibit the user from encountering the suspicious person intruding into the room.

According to a fifth aspect of the present disclosure, in the above aspect, the simulation may include a sound of voices carrying out a conversation.

According to the server of the fifth aspect, the sound in which a conversation is performed is included. Accordingly, the fifth aspect of the present disclosure may simulate a situation in which plural persons are present in the room. Therefore, it becomes more difficult for the suspicious person to intrude into the room. Thus, the fifth aspect of the present disclosure may further inhibit the suspicious person from intruding into the room, and may inhibit the user from encountering the suspicious person intruding into the room.

According to a sixth aspect of the present disclosure, in the fifth aspect, the conversation may include a conversation with the user who has arrived at the destination.

According to the server according to the sixth aspect, since a situation is simulated in which the user has a conversation with the person in the room, a situation that there is a person other than the user in the room, may be further emphasized. Thus, the sixth aspect of the present disclosure may further inhibit the suspicious person from intruding into the room, and may inhibit the user from encountering the suspicious person intruding into the room.

According to a seventh aspect of the present disclosure, in the above aspect, the user may be moving by a vehicle, and the information acquiring section may acquire the position information, the destination, and the route information from a navigation system installed in the vehicle.

According to the server of the seventh aspect, the route information is acquired by the navigation system in the vehicle, that is, a car navigation system. Thus, the seventh aspect of the present disclosure may inhibit the suspicious person from intruding into the room, which is the destination of the user.

An eighth aspect of the present disclosure is a control method for controlling an output of a sound from a sound output device provided in a room of a destination of a moving user, the control method including: acquiring position information indicating a position of the user; acquiring the destination and route information indicating a route of the user to the destination; and in a case in which the user reaches a position within a predetermined range from the destination, controlling the sound output device to start the output of a sound that simulates a situation in which a person is present in the room based on the position of the user indicated by the position information and the route of the user indicated by the route information.

According to the control method of the eighth aspect, as in the server of the first aspect, in the case in which the user reaches the position within the predetermined range from the destination, the sound output device starts output of the sound that simulates the situation in which the person is present in the room. Accordingly, the eighth aspect of the present disclosure may simulate the situation in which the person is present in the room before the user arrives at the destination and from a time at which the user reaches near the destination. Therefore, the eighth aspect of the present disclosure may inhibit a suspicious person from intruding into the room of the destination of the user.

A ninth aspect of the present disclosure is a non-transitory computer readable medium storing a control program causing a computer to execute a process for controlling an output of a sound from a sound output device provided in a room of a destination of a moving user, the process including: acquiring position information indicating a position of the user; acquiring the destination and route information indicating a route of the user to the destination; and in a case in which the user reaches a position within a predetermined range from the destination, controlling the sound output device to start the output of a sound that simulates a situation in which a person is present in the room based on the position of the user indicated by the position information and the route of the user indicated by the route information.

According to the control program of the ninth aspect, in the case in which the user reaches the position within the predetermined range from the destination, the sound output device starts output of the sound that simulates the situation in which the person is present in the room. Accordingly, the ninth aspect of the present disclosure may simulate the situation in which the person is present in the room before the user arrives at the destination and from a time at which the user reaches near the destination. Therefore, the ninth aspect of the present disclosure may inhibit a suspicious person from intruding into the room of the destination of the user.

According to the above aspects, the present disclosure may provide a server, a control method, and a non-transitory computer readable medium storing a control program that may inhibit a suspicious person from intruding into a room, which is a destination of a user.

BRIEF DESCRIPTION OF THE DRAWINGS

Exemplary embodiments will be described in detail based on the following figures, wherein.

DETAILED DESCRIPTION

Hereinafter, exemplary embodiments of the disclosure will be described in detail with reference to the drawings.

[First Exemplary Embodiment]

Figure 1:
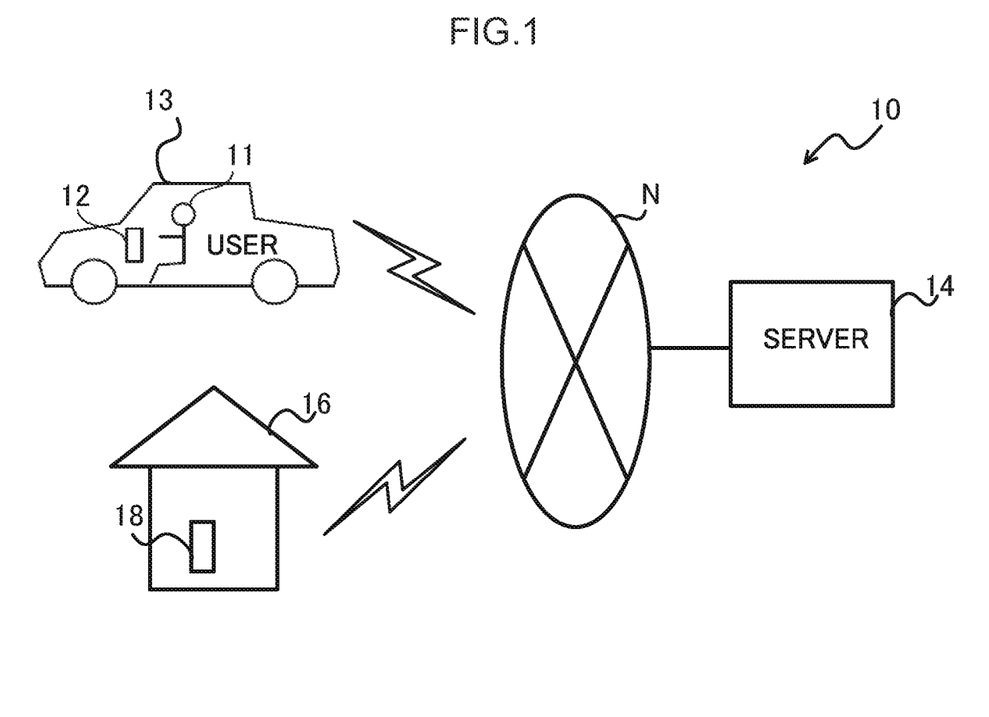
FIG. 1 is a diagram showing a configuration of a sound output control system according to a first exemplary embodiment.

First, a configuration of a sound output control system 10 according to the present exemplary embodiment will be described with reference to FIG. 1. As shown in FIG. 1, the sound output control system 10 according to the present exemplary embodiment includes a navigation system 12, a server 14, and a sound output device 18.

The navigation system 12 according to the present exemplary embodiment is a car navigation system mounted in advance in a vehicle 13, but may be brought from the outside into the vehicle 13 by a user 11. The server 14 according to the present exemplary embodiment controls a sound output from the sound output device 18, based on route information and position information acquired from the navigation system 12.

The navigation system 12, the server 14, and the sound output device 18 are connected to a network N by wireless communication. Therefore, the navigation system 12 and the server 14 can communicate with each other through the network N. Further, the server 14 and the sound output device 18 can communicate with each other through the network N.

Next, hardware configurations of the server 14 and the sound output device 18 will be described.

First, a hardware configuration of the server 14 will be described with reference to FIG. 2. Examples of the server 14 according to the present exemplary embodiment can include a server computer such as a so-called cloud server.

Figure 2:
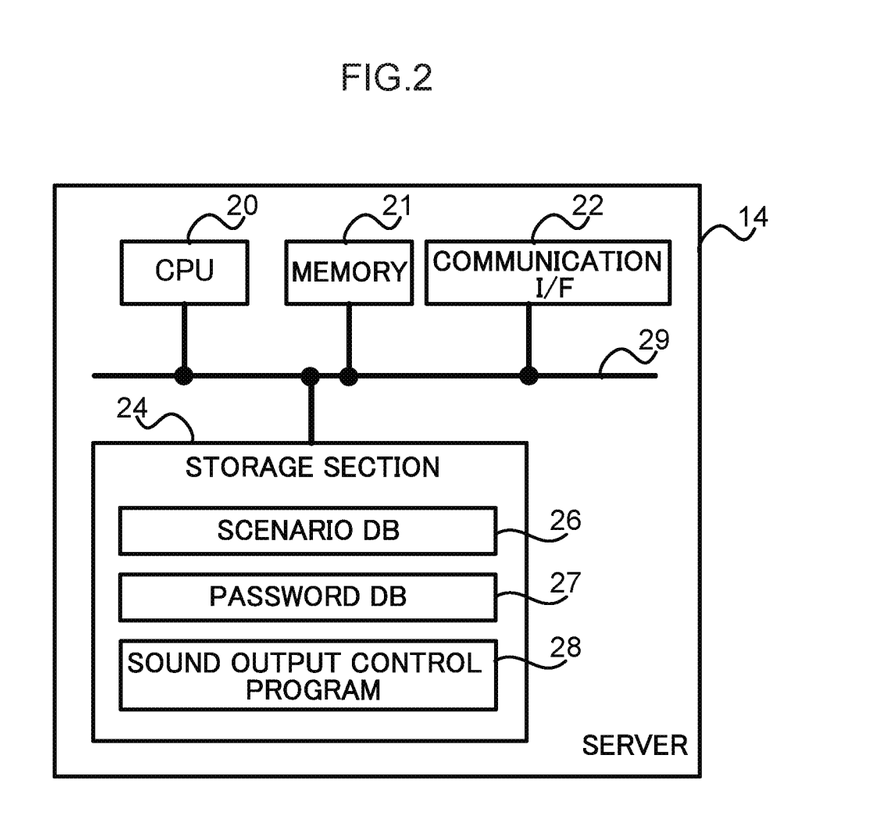
FIG. 2 is a block diagram showing a hardware configuration of a server according to the first exemplary embodiment.

As shown in FIG. 2, the server 14 includes a central processing unit (CPU) 20 and a memory 21 as a temporary storage area. Further, the server 14 includes a communication interface (I/F) 22 used at the time of performing communication with an external device, and a storage section 24 that is non-volatile. The CPU 20, the memory 21, the communication I/F 22, and the storage section 24 are connected to a bus 29.

Figure 3:
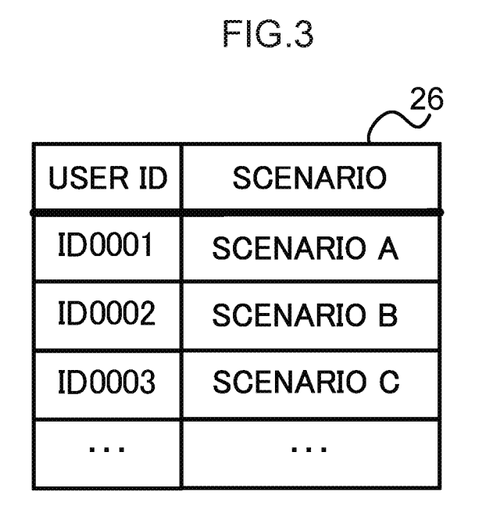
FIG. 3 is a diagram showing a scenario database according to the first exemplary embodiment.

The storage section 24 stores a scenario database (DB) 26 and a password database (DB) 27. In FIG. 3, an example of the scenario DB 26 is shown. The scenario DB 26 is a database relating to scenarios (hereinafter, referred to as "simulation scenarios") of a sound that simulates a situation in which a person is present in a room of a house 16, or the like. As shown in FIG. 3, in the scenario DB 26 according to the present exemplary embodiment, simulation scenarios selected by the user 11 are stored in association with user identifications (IDs). User identifications (IDs) are for specifying the users and are provided for each of users. As shown in "Scenario A" and "Scenario B" in FIG. 3, plural simulation scenarios are provided.

Further, the simulation scenarios include a simulation scenario (hereinafter, referred to as an "a scenario when absent") for simulating a situation in which a person is present in the room when the user 11 is absent, and a simulation scenario (hereinafter referred to as a "conversation scenario") for simulating a situation in which a conversation is made with the user 11 when the user 11 comes home. Note that the "scenario when absent" and the "conversation scenario" stored in the scenario DB 26 may be sound data themselves or may be information for generating the sound data.

The scenario when absent includes information for outputting a sound in which plural persons have a conversation with one another, sounds generated when a person moves, and the like. However, the present disclosure is not particularly limited thereto. The scenario when absent may include the information for outputting the sound (voice) in which the plural persons have a conversation with one another, since it is possible to simulate a situation in which plural persons are present in a room, and may further inhibit intrusion of a suspicious person. Further, since it is generally more difficult for a suspicious person to intrude into the room, in a case in which a person present in the room is an adult than in a case in which the person present in the room is a child, and in a case in which the person present in the room is a man than in a case in which the person present in the room is a woman, the scenario when absent may include information for outputting a sound (voice) of the adult or information for outputting a sound (voice) of the man.

Meanwhile, the conversation scenario includes information for outputting a sound for emphasizing that there is a person other than the user 11 in the room, by simulating a situation in which a person is in the room (in the house 16) and the user 11 have a conversation with each other, but is not particularly limited.

Hereinafter, in a case in which the simulation scenario, the scenario when absent, the conversation scenario, and the like, are referred regardless of a kind of scenario, they will be referred as a "scenario".

Figure 4:
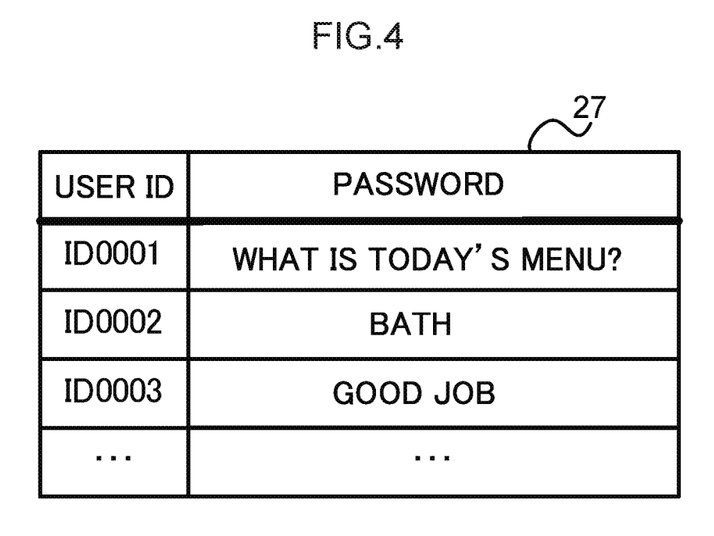
FIG. 4 is a diagram showing a password database according to the first exemplary embodiment.

In FIG. 4, an example of the password DB 27 is shown. The password DB 27 is a database relating to passwords for the user 1 to end an output of the sound, corresponding to the scenario from the sound output device 18. As shown in FIG. 4, in the password DB 27 according to the present exemplary embodiment, passwords set in advance by the user are stored in association with user IDs. Note that the "password" may be a single word or may be a combination of plural words, a sentence, or the like, and is not particularly limited.

Further, the storage section 24 stores a sound output control program 28 for executing a sound output control process (to be described in detail below) for controlling the output of the sound by the sound output device 18.

Next, a hardware configuration of the sound output device 18 will be described with reference to FIG. 5. Examples of the sound output device 18 according to the present exemplary embodiment can include an artificial intelligence (AI) speaker, a smartphone, a mobile information terminal device, and the like.

Figure 5:
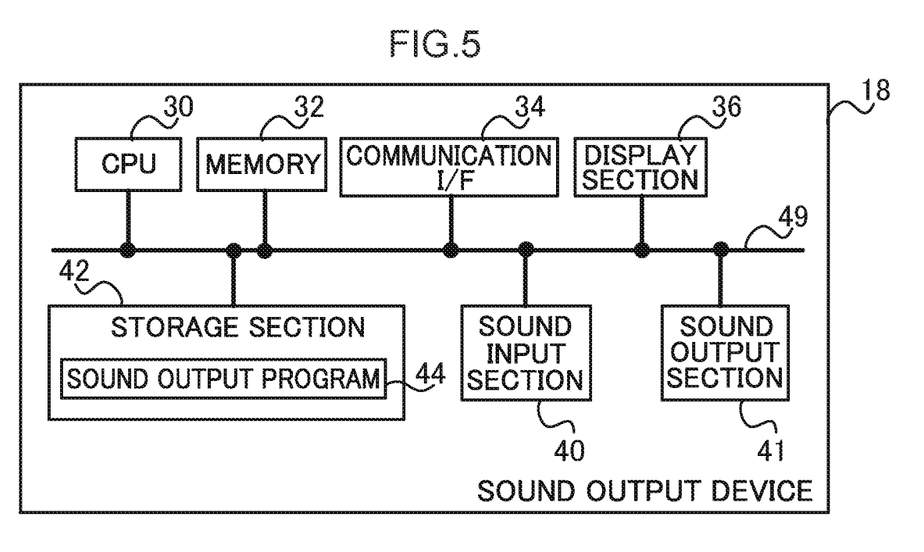
FIG. 5 is a block diagram showing a hardware configuration of a sound output device according to the first exemplary embodiment.

As shown in FIG. 5, the sound output device 18 includes a CPU 30 and a memory 32 as a temporary storage area. Further, the sound output device 18 includes a communication I/F 34 used at the time of performing communication with an external device, a display section 36 such as a liquid crystal display, a sound input section 40 such as a microphone, a sound output section 41 outputting information by a sound, such as a speaker, and a storage section 42 that is non-volatile. The CPU 30, the memory 32, the communication I/F 34, the display section 36, the sound input section 40, the sound output section 41, and the storage section 42 are connected to a bus 49.

The storage section 42 stores a sound output program 44 for executing a sound output process for outputting the sound under a control of the server 14.

Next, a functional configuration of the sound output control system 10 according to the present exemplary embodiment will be described with reference to FIG. 6.

Figure 6:
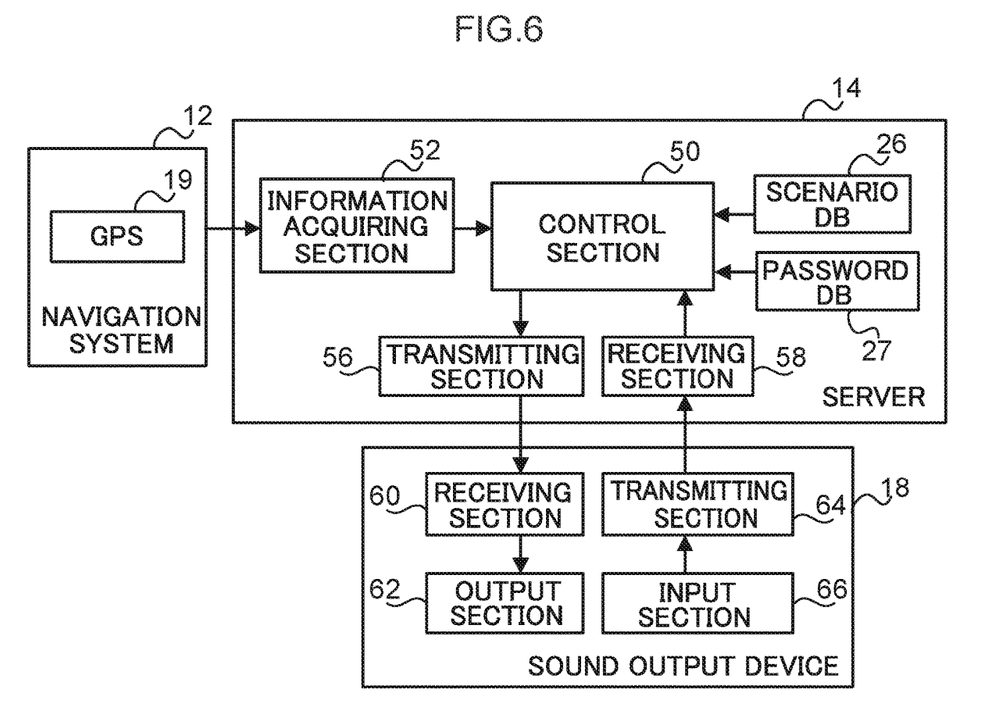
FIG. 6 is a block diagram showing a functional configuration of a sound control system according to the first exemplary embodiment.

As shown in FIG. 6, the navigation system 12 includes a global positioning system (GPS) 19. The navigation system 12 searches for a route from a current position of the user 11 to a destination, based on the current position of the user 11 (a current position of the vehicle 13) detected by the GPS 19 and the destination set by the user 11, according to an instruction of the user 11. A method of searching for the route by the navigation system 12 is not particularly limited, and the existing navigation system technology can be applied.

The navigation system 12 transmits position information indicating the current position detected by the GPS 19 to the server 14 in association with a user ID. Note that hereinafter, in a case in which the user 11 is getting in the vehicle 13, a position of the vehicle 13 and a position of the user 11 are handled as the same meaning. Further, the navigation system 12 transmits route information including information indicating the destination set by the user 11 and information indicating the route, which is a search result, to the server 14 in association with the user ID. Note that an ID assigned to the navigation system 12 itself may be used as the user ID. However, the user ID set by the user 11 for the navigation system 12 may be used, since the sound output control system 10 of the present exemplary embodiment may be applied to plural users 11 using the same vehicle 13 (navigation system 12).

As shown in FIG. 6, the server 14 includes a control section 50, an information acquiring section 52, a transmitting section 56, and a receiving section 58. The CPU 20 of the server 14 functions as the control section 50, the information acquiring section 52, the transmitting section 56, and the receiving section 58 shown in FIG. 6 by executing the sound output control program 28 stored in the storage section 24.

The control section 50 controls the overall operation of the server 14. Further, the control section 50 controls the output of a sound corresponding to a scenario of each user 11 by the sound output device 18, with reference to the scenario DB 26 and the password DB 27.

The information acquiring section 52 acquires the position information from the navigation system 12 through the communication I/F 22. Further, the information acquiring section 52 acquires the route information from the navigation system 12 through the communication I/F 22.

The transmitting section 56 transmits an output instruction of a sound and a sound data corresponding to the scenario, to the sound output device 18 through the communication I/F 22. The receiving section 58 receives a sound data of the user 11, or the like, from the sound output device 18 through the communication I/F 22.

Meanwhile, as shown in FIG. 6, the sound output device 18 includes a receiving section 60, an output section 62, a transmitting section 64, and an input section 66. The CPU 30 of the sound output device 18 functions as the receiving section 60, the output section 62, the transmitting section 64, and the input section 66 shown in FIG. 6 by executing the sound output program 44 stored in the storage section 42.

The receiving section 60 allows the output section 62 to output the sound from the sound output section 41 based on the output instruction and the sound data received from the server 14 through the communication I/F 34. The transmitting section 64 transmits the sound data, such as a voice of the user 11 input from the sound input section 40 by the input section 66, to the server 14 through the communication I/F 34.

Next, an operation of the server 14 according to the present exemplary embodiment will be described.

Figure 7:
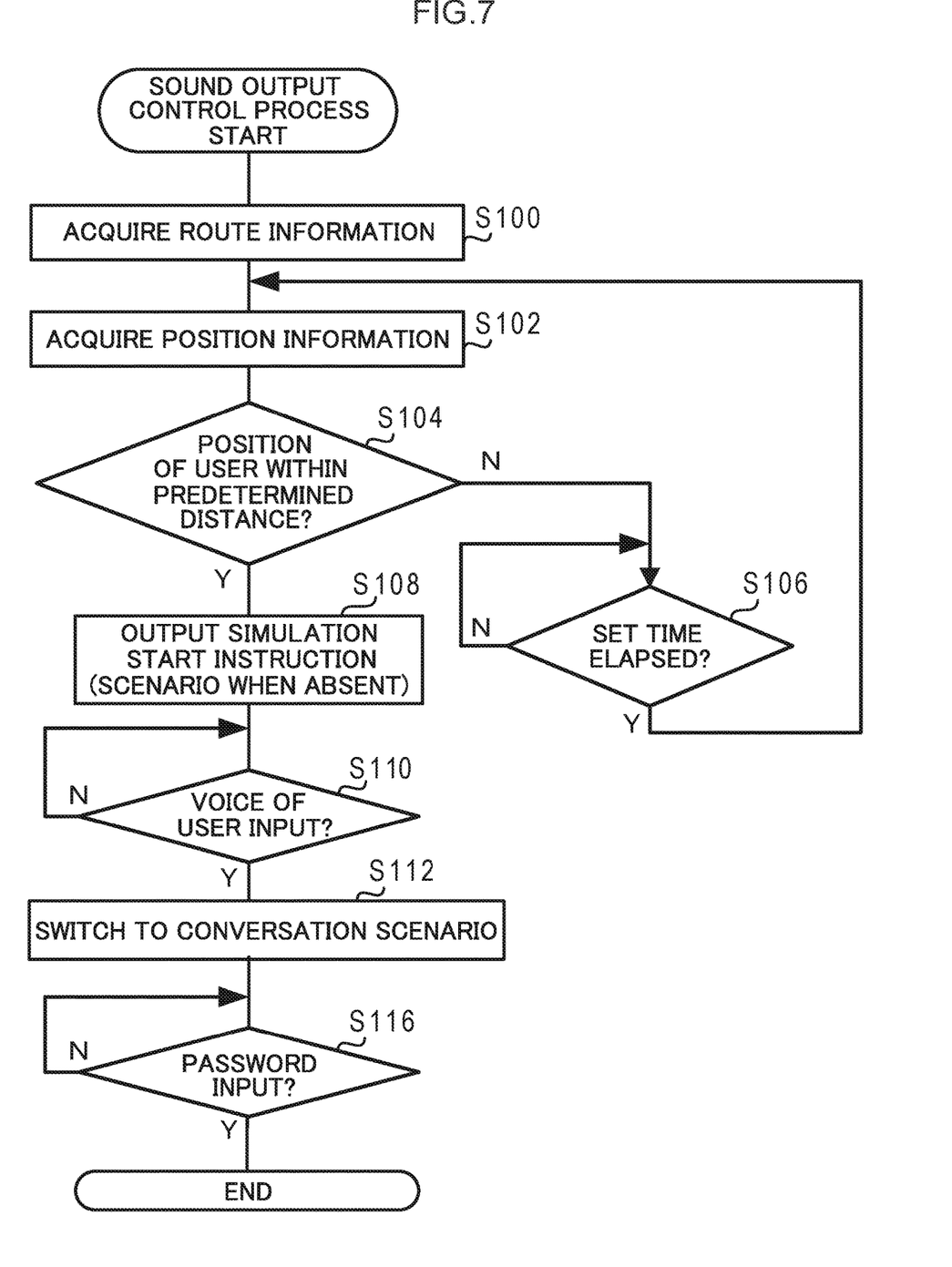
FIG. 7 is a flowchart showing a sound output control process executed by the server according to the first exemplary embodiment.

A sound output control process executed by the server 14 will be described with reference to FIG. 7. FIG. 7 is a flowchart showing an example of a flow of a sound output control process executed by the CPU 20 of the server 14 according to the present exemplary embodiment. As described above, in the present exemplary embodiment, the sound output control process shown in FIG. 7 is executed by executing the sound output control program 28 stored in advance in the storage section 24 using the CPU 20.

In the present exemplary embodiment, when the user 11 in the vehicle 13 sets the destination in the navigation system 12 for returning to the house 16, the position information and the route information are transmitted from the navigation system 12 to the server 14. The sound output control process shown in FIG. 7 is executed, for example, in a case in which the route information transmitted from the navigation system 12 is received. Hereinafter, a case in which the destination is the house 16 of the user 11 will be described as an example.

In step S100 shown in FIG. 7, the control section 50 acquires the route information received from the navigation system 12 by the information acquiring section 52.

In the next step S102, the control section 50 acquires the position information received from the navigation system 12 by the information acquiring section 52.

In the next step S104, the control section 50 determines whether or not a position of the user 11 is within a predetermined distance from the house 16. The control section 50 according to the present exemplary embodiment performs the simulation by executing the scenario when absent from a time at which the user 11 approaches the vicinity of the house 16 before the user 11 arrives at the house 16. Therefore, a distance from the house 16, which becomes the vicinity of the house 16, is determined as a predetermined distance. Note that the predetermined distance may be set by the user 11. A specific example of the predetermined distance may be 1 km, 500 m, or the like.

In a case in which the position of the user 11 is not within the predetermined distance from the house 16, in other words, in a case in which the position of the user 11 is farther from the house 16 than the predetermined distance, a negative determination is made in step S104, and the process proceeds to step S106.

In step S106, the control section 50 determines whether or not a set time in which timing for acquiring the position information is set has elapsed. Specifically, the control section 50 determines whether or not the set time has elapsed since the process of step S102 is executed. Note that the predetermined time may also be settable by the user 11. A specific example of the set time may be three minutes, five minutes, or the like.

Until the set time elapses, a negative determination is made in step S106. On the other hand, when the set time elapses, an affirmative determination is made in step S106, the process returns to step S102, and the processes in steps S102 and S104 are repeated.

On the other hand, in a case in which the position of the user 11 is within the predetermined distance from the house 16, an affirmative determination is made in step S104, and the process proceeds to step S108.

In step S108, the control section 50 allows the transmitting section 56 to transmit a simulation start instruction for starting the simulation to the sound output device 18. Specifically, the control section 50 acquires a scenario that corresponds to a user ID associated with the route information received in step S100 from the scenario DB 26. The transmitting section 56 transmits the sound data corresponding to the scenario when absent included in the acquired scenario, together with the simulation start instruction, to the sound output device 18. In the present exemplary embodiment, the sound data corresponding to the scenario when absent is continuously transmitted from the server 14 to the sound output device 18 until an affirmative determination is made in step S110.

In the sound output device 18 that has received the simulation start instruction by the receiving section 60, the output section 62 outputs a sound (voice) corresponding to the received sound data from the sound output section 41.

In the next step S110, the control section 50 determines whether or not a voice of the user 11 has been input to the sound output device 18. In the present exemplary embodiment, when the user 11 returns to the house 16, the user 11 speaks to the sound output device 18 to indicate that he/she has returned to the house 16. The speaking of the user 11 to the sound output device 18 is input to the sound output device 18 by the sound input section 40, is recognized by the input section 66, and is transmitted as a sound data from the transmitting section 64 to the server 14. The server 14 applies an existing speech analysis technique to the sound data received by the receiving section 58 to determine whether or not the sound data is the voice of the user 11. Note that information for specifying the sound data of the user 11 is preset in the server 14.

Until the voice of the user 11 is input to the sound output device 18, a negative determination is made in step S110. On the other hand, in a case in which the voice of the user 11 is input to the sound output device 18, that is, in a case in which the user 11 returns to the house 16, an affirmative determination is made in step S110, and the sound output control process proceeds to step S112.

In step S112, the control section 50 converts the sound data transmitted to the sound output device 18 into a sound data corresponding to the conversation scenario.

Through this process, the sound data corresponding to the conversation scenario is output from the sound output device 18, such that it seems that a person in the house 16 and the user 11 have a conversation with each other. In this way, for example, when the user 11 returns to the house 16 and opens a door of the house 16, a situation is simulated in which the user 11 has a conversation with the person in the house 16, such that it is possible to enhance an effect of allowing a suspicious person following the user 11 to consider that the person is present in the house 16.

In the next step S116, the control section 50 determines whether or not a password has been input to the sound output device 18. Specifically, the control section 50 determines whether or not a password corresponding to the user ID associated with the route information received in step S100 has been input with reference to the password DB 27.

Until the password is input to the sound output device 18, a negative determination is made in step S116, and when the password is input to the sound output device 18, an affirmative determination is made in step S116, and the sound output control process ends. Referring to the password DB 27 shown in FIG. 4, for example, in a case in which the user ID is "ID0003", when the user 11 speaks the words "good job" and the voice is input to the sound output device 18, the sound output control process ends.

As described above, in the present exemplary embodiment, it is possible to continuously simulate the situation in which the person is present in the house 16 by the conversation scenario, as long as the user inputs the password. For this reason, intrusion of the suspicious person may be further inhibited, and, for example, intrusion of a suspicious person looking furtively at a state in the house 16 outdoors after the user 11 comes home may also be inhibited. Further, since the simulation is continued until the user 11 parks the vehicle 13 in a parking lot and returns to the house 16, for example, when the user 11 opens the door of the house 16, the present exemplary embodiment may inhibit the suspicious person from intruding into the house 16 together with the user 11.

[Second Exemplary Embodiment]

Hereinafter, a second exemplary embodiment will be described in detail. In the present exemplary embodiment, the same components and operations as those described in the first exemplary embodiment are denoted by the same reference numerals, and a detailed description thereof will be omitted.

Since a configuration of a sound output control system 10 is the same as that of the sound output control system 10 according to the first exemplary embodiment, a description thereof will be omitted. In the present exemplary embodiment, a navigation system 12 searches for a route, derives an estimated arrival time at which a vehicle 13 arrives at a destination (a house 16, or the like), and transmits estimated arrival time information indicating the estimated arrival time to a server 14.

In the present exemplary embodiment, a sound output control process executed by a CPU 20 of the server 14 is different from the sound output control process (see FIG. 7) in the first exemplary embodiment.

Figure 8:
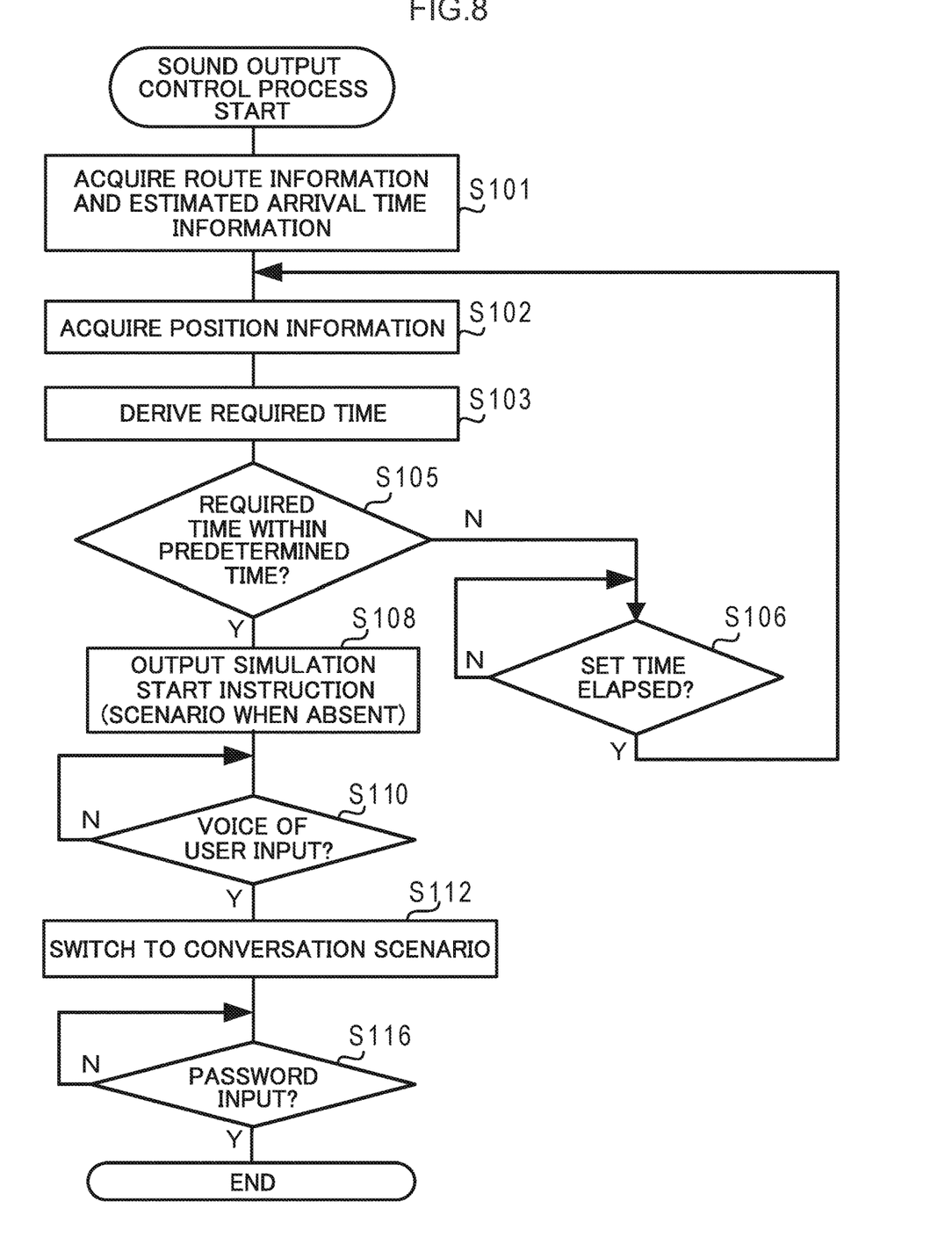
FIG. 8 is a flowchart showing a sound output control process executed by a server according to a second exemplary embodiment.

FIG. 8 is a flowchart showing an example of a flow of the sound output control process executed by the CPU 20 according to the present exemplary embodiment. Since the sound output control process shown in FIG. 8 includes the same processes as those of the sound output control process according to the first exemplary embodiment shown in FIG. 7, the same processes will be denoted by the same reference numerals, and a detailed description thereof will be omitted.

The sound output control process shown in FIG. 8 is different from the sound output control process shown in FIG. 7 in that a process of step S101 is executed instead of the process of step S100 shown in FIG. 7 and processes of step S103 and step S105 are executed instead of the process of step S104 in FIG. 7.

In step S101 shown in FIG. 8, a control section 50 acquires route information and estimated arrival time information received from a navigation system 12 by an information acquiring section 52.

Further, in step S103, the control section 50 derives a required time required for the user to arrive at a house 16 from the estimated arrival time information acquired in step S101. A method of deriving the required time by the control section 50 is not particularly limited, and for example, a time obtained by subtracting a time corresponding to the estimated arrival time information from a current time may be derived as the required time. In this way, simulation is started at a time that the required time earlier than the estimated arrival time at which a user 11 is estimated to arrive at the house 16.

In step S105, the control section 50 determines whether or not the required time is within a predetermined time. In a case in which the required time is not within the predetermined time, in other words, in a case in which a time more than the predetermined time is required until the user 11 returns to the house 16, a negative determination is made in step S105, and the process proceeds to step S106. In the present exemplary embodiment, in a case in which an affirmative determination is made in step S106, the process returns to step S102.

On the other hand, in a case in which the required time is within the predetermined time, an affirmative determination is made in step S105, and the process proceeds to step S108.

In the server 14 according to the present exemplary embodiment, as described above, instead of step S104 (of determining whether or not the user 11 is within the predetermined distance) of the sound output control process according to the first exemplary embodiment, it is determined whether or not the required time is within the predetermined time, such that it is possible to perform the simulation by executing a scenario when absent from a time at which the user 11 approaches the vicinity of the house 16 before the user 11 arrives at the house 16, as in the first exemplary embodiment.

Note that a method of acquiring the estimated arrival time information is not limited to the present exemplary embodiment, and for example, the control section 50 may derive the estimated arrival time information based on a moving speed of the vehicle 13 and the route information.

As described above, the server 14 according to each of the abovementioned exemplary embodiments is the server 14 that controls the output of the sound from the sound output device 18 provided in the room of the house 16, which is the destination of the moving user 11. The server 14 includes the information acquiring section 52 that acquires the position information indicating the position of the user 11, the destination, and the route information indicating the route of the user up to the destination. The server 14 includes the control section 50 that controls the sound output device 18 to start the output of the sound that simulates the situation in which the person is present in the room of the house 16 in a case in which the user 11 reaches a position within a predetermined range from the house 16, based on the position of the user 11 indicated by the position information acquired by the information acquiring section 52 and the route of the user 11 indicated by the route information acquired by the information acquiring section 52.

As described above, according to the server 14 according to each of the abovementioned exemplary embodiments, it is possible to allow the sound output device 18 in the house 16 to start the output of the sound that simulates the situation in which the person is present in the room in the case in which the user 11 reaches the position within the predetermined range from the house 16. Accordingly, the present exemplary embodiments may simulate the situation in which the person is present in the room of the house 16 before the user 11 arrives at the house 16 and from a time point at which the user 11 reaches the vicinity of the house 16. Therefore, the abovementioned exemplary embodiments may inhibit the suspicious person from intruding into the room of the house 16 of the user 11.

Note that a case in which the user 11 moves by the vehicle 13 and the navigation system 12 is present in the vehicle 13 has been described in each of the abovementioned exemplary embodiments, but the disclosure is not limited thereto. For example, a form in which the user 11 moves by walking, train, or the like, and the navigation system 12 may be present in a place other than the inside of the vehicle is possible.

Further, a case in which the sound output control process is performed by the server 14 has been described in the present exemplary embodiments. However, the sound output control process may be performed by another device, such as the sound output device 18.

Further, a case in which the server 14 acquires the position information, the route information, and the like from the navigation system 12 has been described in the abovementioned exemplary embodiments. However, a source for acquiring these information is not limited, and for example, these information may be acquired from an electronic control unit (ECU) provided separately from the navigation system 12 or may be acquired from a smartphone, or the like, possessed by the user 11. Further, sources for acquiring the information may be different from each other.

Further, a case in which the process performed by the CPU 20 in the abovementioned exemplary embodiment is a software process performed by executing the program has been described, but the process performed by the CPU 20 may be a process performed by hardware. Further, the process performed by the CPU 20 may be a process performed by combining software and hardware with each other. Further, the sound output control program 28 stored in the storage section 24 may be stored and distributed in various storage media.

Further, the disclosure is not limited to the abovementioned exemplary embodiments, and it goes without saying that various modifications may be made without departing from the spirit of the disclosure, in addition to the abovementioned exemplary embodiments.

What is claimed is:

1. A server for controlling an output of a sound from a sound output device provided in a room of a destination of a moving user, the server comprising:
an information acquiring section configured to acquire position information indicating a position of the user, the destination, and route information indicating a route of the user to the destination; and
a control section configured to:
determine whether the position of the user is within a predetermined distance from the destination before arriving at the destination; and
in response to determining that the position of the user is within the predetermined distance from the destination before arriving at the destination, execute a scenario when absent to control the sound output device to start the output of a sound that simulates a situation in which a person is present in the room based on the position of the user indicated by the position information and the route of the user indicated by the route information.

2. The server according to claim 1, wherein the predetermined distance is predetermined based on a distance from the destination.

3. The server according to claim 1, wherein the predetermined distance is predetermined based on a required time for the user to arrive at the destination.

4. The server according to claim 3, wherein the control section effects control to start the simulation at a time that is the required time earlier than an estimated arrival time at which the user is estimated to arrive at the destination.

5. The server according to claim 1, wherein the simulation includes a sound of voices carrying out a conversation.

6. The server according to claim 5, wherein the conversation includes a conversation with the user who has arrived at the destination.

7. The server according to claim 1, wherein the user is moving by a vehicle, and
the information acquiring section acquires the position information, the destination, and the route information from a navigation system installed in the vehicle.

8. The server according to claim 1, wherein the sound is a simulated conversation, and wherein content of the simulated conversation is controlled by the executed scenario when absent.

9. A control method for controlling an output of a sound from a sound output device provided in a room of a destination of a moving user, the control method comprising:
acquiring position information indicating a position of the user;
acquiring the destination and route information indicating a route of the user to the destination;
determining whether the position of the user is within a predetermined distance from the destination before arriving at the destination; and
in response to determining that the position of the user is within the predetermined distance from the destination before arriving at the destination, executing a scenario when absent to control the sound output device to start the output of a sound that simulates a situation in which a person is present in the room based on the position of the user indicated by the position information and the route of the user indicated by the route information.

10. The control method according to claim 9, wherein the sound is a simulated conversation, and wherein content of the simulated conversation is controlled by the executed scenario when absent.

11. A non-transitory computer readable medium storing a control program causing a computer to execute a process for controlling an output of a sound from a sound output device provided in a room of a destination of a moving user, the process comprising:
acquiring position information indicating a position of the user;
acquiring the destination and route information indicating a route of the user to the destination;

determining whether the position of the user is within a predetermined distance from the destination before arriving at the destination; and in response to determining that the position of the user is within the predetermined distance from the destination before arriving at the destination, executing a scenario when absent to control the sound output device to start the output of a sound that simulates a situation in which a person is present in the room based on the position of the user indicated by the position information and the route of the user indicated by the route information.

12. The non-transitory computer readable medium according to claim 11, wherein the sound is a simulated conversation, and wherein content of the simulated conversation is controlled by the executed scenario when absent.

* * * * *

UNITED STATES PATENT AND TRADEMARK OFFICE
CERTIFICATE OF CORRECTION

PATENT NO. : 10,679,479 B2  
APPLICATION NO. : 16/229858  
DATED : June 9, 2020  
INVENTOR(S) : Hideki Kobayashi et al.

Page 1 of 1

It is certified that error appears in the above-identified patent and that said Letters Patent is hereby corrected as shown below:

On the Title Page

Item (72), inventor 1, city, delete "Miyoshi" and insert --Miyoshi-shi, Aichi-ken--, therefor.

Item (72), inventor 2, city, delete "Nagoya" and insert --Nagoya-shi, Aichi-ken--, therefor.

Item (72), inventor 3, city, delete "Toyota" and insert --Toyota-shi, Aichi-ken--, therefor.

Item (72), inventor 4, city, delete "Chiryu" and insert --Chiryu-shi, Aichi-ken--, therefor.

Item (72), inventor 5, city, delete "Nagoya" and insert --Nagoya-shi, Aichi-ken--, therefor.

Item (72), inventor 6, city, delete "Nagoya" and insert --Nagoya-shi, Aichi-ken--, therefor.

Signed and Sealed this  
Eighteenth Day of August, 2020

Andrei Iancu  
*Director of the United States Patent and Trademark Office*